US012709792B2

(12) United States Patent
Rufin

(10) Patent No.: US 12,709,792 B2
(45) Date of Patent: Aug. 18, 2026

(54) METAL MATRIX COMPOSITE TAPE FABRICATION, BRAIDING, AND CONSOLIDATION TO FORM METAL MATRIX COMPOSITE PARTS

(71) Applicant: The Boeing Company, Arlington, VA (US)

(72) Inventor: Antonio Carlos Rufin, Seattle, WA (US)

(73) Assignee: The Boeing Company, Arlington, VA (US)

( * ) Notice: Subject to any disclaimer, the term of this patent is extended or adjusted under 35 U.S.C. 154(b) by 591 days.

(21) Appl. No.: 18/338,534

(22) Filed: Jun. 21, 2023

(65) Prior Publication Data

US 2023/0349082 A1 Nov. 2, 2023

Related U.S. Application Data

(62) Division of application No. 16/366,045, filed on Mar. 27, 2019, now Pat. No. 11,697,895.

(51) Int. Cl.

| | |
|---|---|
| ***C23C 4/06*** | (2016.01) |
| ***B23K 31/02*** | (2006.01) |
| ***C23C 4/134*** | (2016.01) |
| *B23K 101/34* | (2006.01) |
| *D04C 1/02* | (2006.01) |

(Continued)

(52) U.S. Cl.

CPC ................ *C23C 4/06* (2013.01); *B23K 31/02* (2013.01); *C23C 4/134* (2016.01); *B23K 2101/34* (2018.08); *D04C 1/02* (2013.01); *D04C 1/06* (2013.01); *D04C 3/14* (2013.01); *D04C 3/48* (2013.01); *D10B 2101/08* (2013.01); *D10B 2101/14* (2013.01); *D10B 2101/20* (2013.01);

(Continued)

(58) Field of Classification Search

CPC .............. B23K 2103/10; B23K 1/0056; B23K 11/0013; B23K 2101/34; B22D 19/02; B32B 15/01; C23C 4/06; C23C 4/134

See application file for complete search history.

(56) References Cited

U.S. PATENT DOCUMENTS 4,200,126 A 4/1980 Fish
4,649,060 A * 3/1987 Ishikawa ................ C22C 47/08 427/601

(Continued)

FOREIGN PATENT DOCUMENTS

EP 1726679 A1 11/2006
WO 9811265 A1 3/1998

OTHER PUBLICATIONS

Braiding-an overview; ScienceDirect Topics; https://www.sciencedirect.com/topics/materials-science/braiding; Mar. 18, 2019.

(Continued)

*Primary Examiner* — Erin B Saad
(74) *Attorney, Agent, or Firm* — Yee & Associates, P.C.

(57) ABSTRACT

Systems and methods are provided for braiding Metal Matrix composite (MMC) tape. One method includes drawing multiple lanes of MMC tape, comprising a matrix of metal reinforced by fibers, from bobbins arranged around a mandrel. The method also includes braiding the multiple lanes to form a preform at the mandrel for an MMC part and consolidating the preform via application of heat and pressure.

20 Claims, 11 Drawing Sheets

(51) Int. Cl.

| | |
|---|---|
| *D04C 1/06* | (2006.01) |
| *D04C 3/14* | (2006.01) |
| *D04C 3/48* | (2006.01) |

(52) U.S. Cl.

CPC ...... *D10B 2505/02* (2013.01); *D10B 2505/12* (2013.01)

(56) References Cited

U.S. PATENT DOCUMENTS

| | | | | | |
|---|---|---|---|---|---|
| 4,961,990 | A * | 10/1990 | Yamada | C04B 35/58028 428/323 |
| 5,398,586 | A | 3/1995 | Akiyama et al. | |
| 5,580,835 | A * | 12/1996 | Wright | C04B 35/62231 427/443.2 |
| 6,024,005 | A | 2/2000 | Uozumi | |
| 6,064,031 | A * | 5/2000 | Talwar | C22C 47/14 219/121.64 |
| 6,344,270 | B1 | 2/2002 | McCullough et al. | |
| 6,455,804 | B1 | 9/2002 | Gordon et al. | |
| 6,485,796 | B1 * | 11/2002 | Carpenter | C22C 47/08 427/601 |
| 7,164,096 | B1 | 1/2007 | Gordon et al. | |
| 7,186,948 | B1 * | 3/2007 | Gordon | B23K 26/123 219/121.64 |
| 8,387,504 | B2 * | 3/2013 | Cairo | B22D 19/14 87/5 |
| 9,718,248 | B2 | 8/2017 | Marcoe et al. | |
| 10,399,657 | B2 * | 9/2019 | Zahlen | B23K 11/0013 |
| 11,697,895 | B2 | 7/2023 | Rufin | |
| 2002/0108932 | A1 * | 8/2002 | Gordon | C22C 21/02 219/121.85 |
| 2012/0255947 | A1 | 10/2012 | Matsen et al. | |
| 2014/0102578 | A1 | 4/2014 | Bartel et al. | |
| 2017/0297674 | A1 * | 10/2017 | Zahlen | B23K 11/002 |
| 2020/0306891 | A1 * | 10/2020 | Rufin | C23C 4/134 |
| 2020/0399748 | A1 * | 12/2020 | Bystricky | D02G 3/04 |

OTHER PUBLICATIONS

Foltz et al.Metal-Matrix Composites; ASM Int'l 1990.

http://www.trl.com/metpreg/ (2016).

Irick, et al, "MetPreg Metallic Prepregs for the Composites Industry," Copyright 2023, 19 pages, Touchstone Research Laboratory Ltd., Triadelphia, WV, accessed Sep. 11, 2023, https://www.metpreg.com/metallic-prepregs-composites-industry.

M. Haghishenas; Metal-Matrix Composites; University of Waterloo, ON, Canada; 2016.

M.F. Miller et al.; Design, Manufacture, Development, Test and Evaluation of Boron/Aluminum Structural Components for Space Shuttle; Aug. 1973.

Majidi et al; Mechanical Behavior of Three-Dimensional Braided Metal Matrix Composites; ASTM Int'l; Nov. 2, 2018.

Metal Matrix Composites; http://www.metpreg.com; Mar. 18, 2019.

Notice of Allowance, dated Feb. 27, 2023, regarding U.S. Appl. No. 16/366,045, 8 pages.

Office Action, dated Nov. 3, 2022, regarding U.S. Appl. No. 16/366,045, 16 pages.

R. Gadow et al; Thermally Sprayed Prepregs for Advanced Metal Matrix Composites; Mar. 26, 2008; https://ceramics.onlinelibrary.wiley.com.

Son N. Trinh et al.; Processing and properties of Metal Matrix Composites; Washington University in St. Louis; May 12, 2016.

US Department of Commerce; Martin Marietta; Final Report; "Damping Characteristics of Metal Matrix Composites" May 1989.

* cited by examiner 150
3
3
140
122
120
160
124
130
126
132
127
124
170
108
160
106
110
104
102
MMC TAPE FABRICATION SYSTEM
100

FIG. 9

10 10 930 722 730 F F F F F F F F 700 720 710 910 920 910 930 AUTOCLAVE 900

FIG. 11

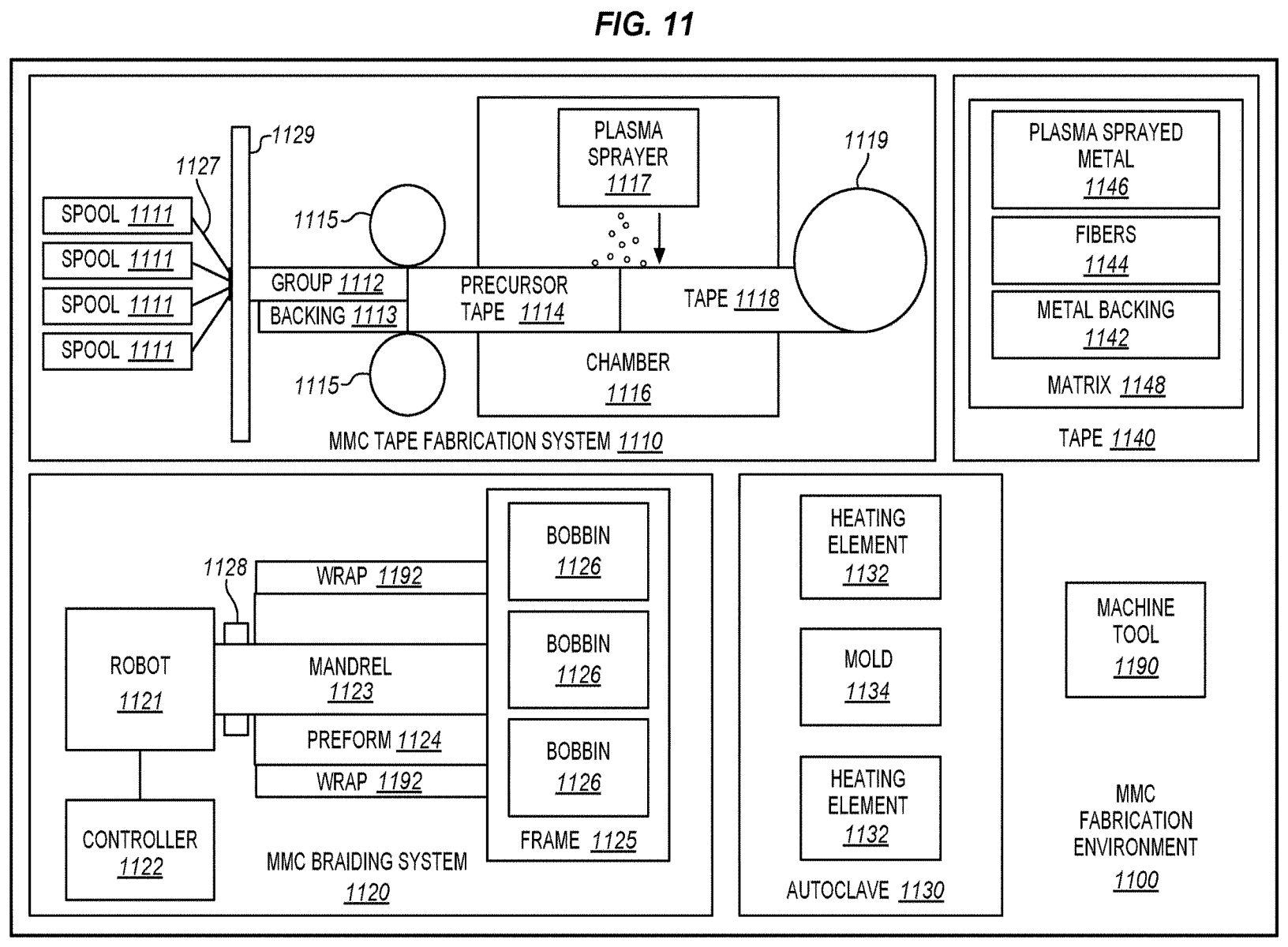

PLASMA SPRAYED METAL 1146
FIBERS 1144
METAL BACKING 1142
MATRIX 1148
TAPE 1140
MACHINE TOOL 1190
MMC FABRICATION ENVIRONMENT 1100
1119
PLASMA SPRAYER 1117
TAPE 1118
CHAMBER 1116
PRECURSOR TAPE 1114
HEATING ELEMENT 1132
MOLD 1134
HEATING ELEMENT 1132
AUTOCLAVE 1130
1129
1115
GROUP 1112
BACKING 1113
1115
MMC TAPE FABRICATION SYSTEM 1110
1127
SPOOL 1111
SPOOL 1111
SPOOL 1111
SPOOL 1111
BOBBIN 1126
BOBBIN 1126
BOBBIN 1126
FRAME 1125
WRAP 1192
MANDREL 1123
PREFORM 1124
WRAP 1192
MMC BRAIDING SYSTEM 1120
1128
ROBOT 1121
CONTROLLER 1122

METAL MATRIX COMPOSITE TAPE FABRICATION, BRAIDING, AND CONSOLIDATION TO FORM METAL MATRIX COMPOSITE PARTS

CROSS-REFERENCE TO RELATED APPLICATION

This application is a divisional of and claims the benefit of U.S. patent application Ser. No. 16/366,045 entitled "METAL MATRIX COMPOSITE TAPE FABRICATION, BRAIDING, AND CONSOLIDATION TO FORM METAL MATRIX COMPOSITE PARTS" filed on Mar. 27, 2019, and granted U.S. Pat. No. 11,697,895 B2 dated Jul. 11, 2023. Accordingly, U.S. patent application Ser. No. 16/366,045 is incorporated herein in its entirety.

FIELD

The disclosure relates to the field of composite design, and in particular, to metal matrix composites.

BACKGROUND

In the context of this specification, Metal Matrix Composite (MMC) materials are described as materials wherein a matrix of metal (e.g., aluminum, titanium, etc.) is reinforced by continuous fibers. MMC materials are desirable because they often exhibit higher strength and stiffness-to-density ratios than comparable composite parts made of thermoset or thermoplastic resins reinforced by carbon fiber.

MMC parts may be formed by laying up a preform comprising multiple layers of woven or otherwise pre-arrayed "dry" fibers and driving molten metal through the fiber preform in order to infiltrate it, or by externally applying pressure onto stacks of pre-impregnated unidirectional fiber-reinforced metal laminate plies at a sufficiently elevated temperature to effect a diffusion bond across the plies. However, these techniques are difficult because molten metal may not adequately penetrate the preform or wet the fibers sufficiently to achieve a structural bond. Furthermore, manufacture and handling of large individual precursor plies or laminated preforms and the external application of pressure at temperatures approaching the melting point of the metal require complex process steps, tooling, and equipment. Hence, fabrication of MMC parts remains a labor-intensive and time-consuming process.

Therefore, it would be desirable to have a method and apparatus that take into account at least some of the issues discussed above, as well as other possible issues.

SUMMARY

Embodiments described herein provide narrow, and thus, easy-to-handle MMC tape that has been pre-impregnated with metal, and further provide associated systems and techniques for braiding MMC tape to form a pre-impregnated MMC preform for consolidation into an MMC part. Because individual coiled rolls of tape include both reinforcing fibers and a matrix of surrounding metal, an MMC preform may be fabricated by laying up braided layers of tape as desired. If needed in order to adjust the amount of reinforcement in the final composite part, braiding unreinforced metal tape may be also used in combination with the reinforced tape. The resultant braided MMC preform is inherently stable and can be easily handled prior to consolidation without the use of clamps or other tools, but if necessary, metal shop joining techniques like spot welding may be used to join loose tape ends. A further element of this invention is that, with the appropriate choice of alloy for the mandrel onto which the preform is braided, the mandrel itself can become an integrally bonded constituent of the final MMC part, instead of simply a discarded mold. Similarly, if an external metallic surface were desired in a final MMC part, such a surface can be created by overwrapping the preform with metal foil or with a tight-fitting split metal sleeve prior to consolidation of the part. During consolidation, sufficient heat and pressure is applied to consolidate the preform, mandrel, and metal overwrap (if used) into a complete and fully bonded MMC part, without a need for injecting additional molten metal or having to rely on complex tools or equipment.

One embodiment is a method for braiding Metal Matrix Composite (MMC) tape. The method includes drawing multiple lanes of MMC tape, comprising a matrix of metal reinforced by fibers, from bobbins arranged around a mandrel. The method also includes braiding the multiple lanes to form a preform at the mandrel for an MMC part and consolidating the preform via application of heat and pressure.

A further embodiment is a non-transitory computer readable medium embodying programmed instructions which, when executed by a processor, are operable for performing a method for braiding Metal Matrix Composite (MMC) tape. The method includes drawing multiple lanes of MMC tape, comprising a matrix of metal reinforced by fibers, from bobbins arranged around a mandrel. The method also includes braiding the multiple lanes to form a preform at the mandrel for an MMC part and consolidating the preform via application of heat and pressure.

A further embodiment is a system for braiding Metal Matrix Composite (MMC) tape. The system includes bobbins arranged in a pattern, each bobbin storing MMC tape comprising a matrix of metal reinforced by fibers. The system also includes a mandrel at which lanes of tape from the bobbins have been laid-up, and a braiding apparatus and robot that translate and orient the mandrel in order to draw additional tape from the lanes and place it onto the mandrel in a controlled fashion.

A further embodiment is a method for fabricating a Metal Matrix Composite (MMC) tape. The method includes collimating fibers to form a group of parallel fibers, applying a metal backing to the group of parallel fibers to form a precursor tape and spraying molten metal atop the precursor tape to encapsulate the fibers in a matrix of metal. The method also includes integrating the molten metal with the precursor tape to form the MMC tape.

A further embodiment is a system for fabricating a Metal Matrix Composite (MMC) tape. The system includes reserves that provide fibers, pressing devices that press the fibers to a metal backing to form a precursor tape, and a sprayer that applies metal to the precursor tape.

A still further embodiment is a manufacture in the form of a Metal Matrix Composite (MMC) tape. The manufacture includes a lane of tape. The lane of tape includes a matrix of metal. The matrix of metal includes a metal backing, and plasma-sprayed metal. The lane of tape also includes fibers disposed within the matrix of metal between the metal backing and the plasma-sprayed metal, that extend along a length of the lane and reinforce the lane.

Other illustrative embodiments (e.g., methods and computer-readable media relating to the foregoing embodiments) may be described below. The features, functions, and advantages that have been discussed can be achieved independently in various embodiments or may be combined in yet other embodiments further details of which can be seen with reference to the following description and drawings.

DESCRIPTION OF THE DRAWINGS

Some embodiments of the present disclosure are now described, by way of example only, and with reference to the accompanying drawings. The same reference number represents the same element or the same type of element on all drawings.

FIG. 9 is a section cut view of the MMC part of FIG. 6 being consolidated in an autoclave in an illustrative embodiment.

FIG. 11 is a block diagram of an MMC fabrication environment in an illustrative embodiment.

DESCRIPTION

The figures and the following description provide specific illustrative embodiments of the disclosure. It will thus be appreciated that those skilled in the art will be able to devise various arrangements that, although not explicitly described or shown herein, embody the principles of the disclosure and are included within the scope of the disclosure. Furthermore, any examples described herein are intended to aid in understanding the principles of the disclosure, and are to be construed as being without limitation to such specifically recited examples and conditions. As a result, the disclosure is not limited to the specific embodiments or examples described below, but by the claims and their equivalents.

Figure 1:
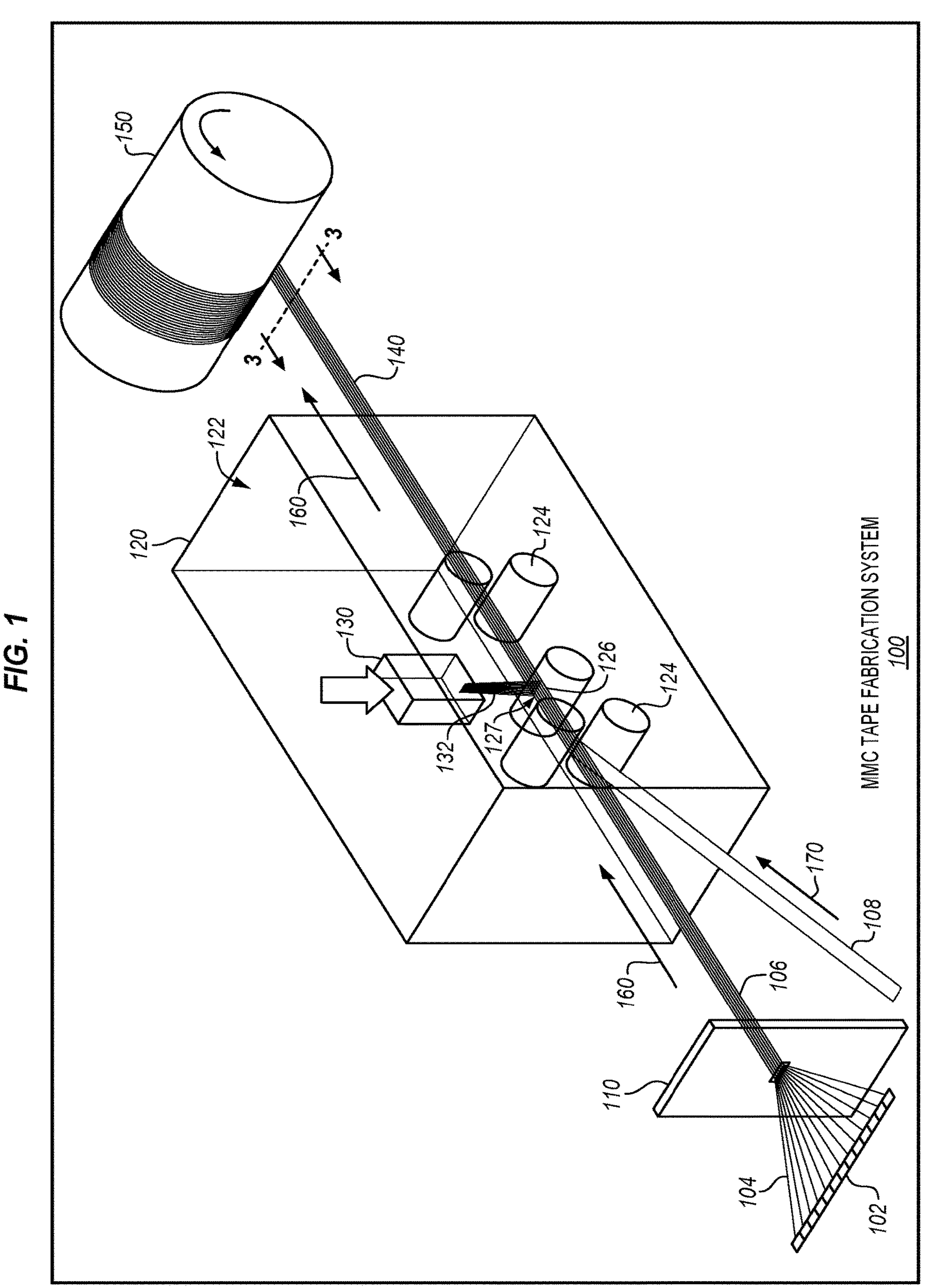
FIG. 1 illustrates an MMC tape fabrication system in an illustrative embodiment.

FIG. 1 illustrates a Metal Matrix Composite (MMC) tape fabrication system 100 in an illustrative embodiment. MMC tape fabrication system 100 comprises any system, device, or component operable to fabricate a tape comprising a metal matrix surrounding fibers of reinforcing material. MMC tape fabrication system 100 is capable of fabricating MMC tape in a continuous manner.

In this embodiment, MMC tape fabrication system 100 includes spools 102 (also known as "reserves"), from which fibers 104 are drawn. Fibers 104 may comprise continuous strands ("tows") of carbon, graphite, silicon carbide, silicon nitride, boron, aluminum oxide, or ceramic oxides, or tow forms of other ceramic or refractory fibers. The fibers 104 may alternatively consist of continuous individual monofilament fibers made of boron, silicon carbide, silicon nitride, aluminum oxide, or other ceramic or refractory materials. The diameter of fibers 104 may be any suitable size, such as between a fraction of one thousandth of an inch and five thousandths of an inch. The fibers may be pretreated with coatings or receive a metal surface designed to promote wettability and limit adverse interaction with the metal matrix during consolidation. Fibers 104 proceed into collimator 110, which spreads and arranges the fibers 104 into a group 106 of parallel continuous fibers. The collimator 110 may consist of an array of fine tubes carrying individual ones of fibers 104, or combs, or other like devices designed to keep the fibers spread and parallel as they are drawn from the spools 102.

Group 106 proceeds in direction 160, and enters chamber 120. Chamber 120 may comprise a vacuum chamber, or a sealed chamber having a volume 122 filled with an inert gas (e.g., argon or another noble gas). An inert gas is used to prevent undesirable chemical reactions such as oxidation from occurring while plasma spraying activities occur (e.g., as described below). Metal backing 108 (e.g., a lane of aluminum or titanium metal foil) proceeds in direction 170 towards group 106. The metal backing 108 may be any suitable size, such as one-eighth to one-quarter of an inch wide and between one thousandth and five thousandths of an inch thick. The composition of the metal backing 108 may be any metallic alloy (e.g., aluminum or titanium) that can contribute to the matrix reinforcement in the final product. Metal compositions may include commercially pure aluminum, titanium, copper or superalloys, including 6000-series aluminum alloys and Ti-15V-3Cr-3Sn-3A1, commonly known as Ti-15-3-3-3, available in thin ribbon or foil form. Other metal compositions, including copper, magnesium, beryllium, and nickel alloys may be similarly employed. The metal backing will become integral with the group 106 of fibers, resulting in an integral metal tape that is reinforced by fibers. Metal backing 108 also provides a surface for receiving additional metal that has been applied via plasma spraying (e.g., as described below).

Rollers 124 (also known as "pressing devices") maintain tension and press the metal backing 108 and group 106 together, holding these components in intimate contact to form a precursor tape 126. The precursor tape 126 has a bottom layer comprising the metal backing, but fibers at a top surface 127 of the precursor tape 126 remain exposed. The fibers on the top surface 127 are kept parallel and slightly spread, covering the majority of the metal backing except near the edges.

As precursor tape 126 proceeds underneath a plasma sprayer 130, it receives a plasma spray 132 of molten metal. The metal may be of a similar (or the same) chemistry as that metal which the metal backing 108 is made from. In embodiments where metal backing 108 and the molten metal are the same metal, they both become integral to form a uniform matrix of metal for encapsulating the group 106 of fibers 104. The plasma spray 132 rapidly cools and solidifies, and is pressed by additional ones of the rollers 124 in order to form a single integral tape, in the form of MMC tape 140. At this stage, MMC tape 140 proceeds in direction 160, and is taken up by spool 150 for later distribution and layup to form an MMC part. Sensors (not shown) operating in real-time may be integrated with rollers 124 to monitor process temperatures and to ensure that the rollers 124 apply a controlled amount of pressing force and/or tension to the various components of FIG. 1.

Illustrative details of the operation of MMC tape fabrication system 100 will be discussed with regard to FIG. 2. Assume, for this embodiment, that spools 102 are at rest, and are loaded with continuous fibers for integration into an MMC tape. Further, assume that fibers and metal backing have been fed through the various respective elements depicted in FIG. 1 to ensure that continuous operations may begin.

Figure 2:
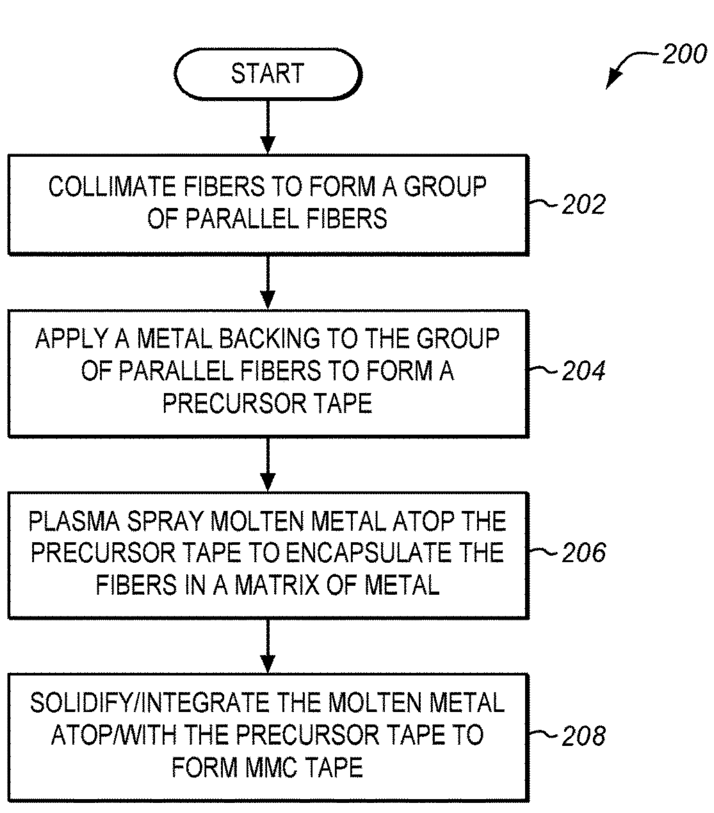
FIG. 2 is a flowchart illustrating a method for fabricating MMC tape in an illustrative embodiment.

FIG. 2 is a flowchart illustrating a method 200 for fabricating an MMC tape in an illustrative embodiment. The steps of method 200 are described with reference to MMC tape fabrication system 100 of FIG. 1, but those skilled in the art will appreciate that method 200 may be performed in other systems. The steps of the flowcharts described herein are not all inclusive and may include other steps not shown. The steps described herein may also be performed in an alternative order.

Rollers 124 begin spinning, which applies tension to fibers 104 and metal backing 108. This tension draws fibers 104 from spools 102 in direction 160, and draws metal backing 108 in direction 170.

In step 202, fibers 104 are spread and collimated to form group 106 of parallel fibers. That is, the continuous motion of rollers 124 pulls fibers 104 through collimator 110, which aligns the fibers 104 into a single, flat array of fibers 104 proceeding in the same direction. The fibers 104 continue to proceed in direction 160, until both group 106 and metal backing 108 are pressed together by rollers 124. This action applies the metal backing 108 to the group 106 of parallel fibers, maintaining intimate contact between the metal backing 108 and the group 106 of fibers and forming a precursor tape 126 in step 204. In many embodiments, this forces the metal backing 108 into intimate contact with group 106 of fibers (e.g., partly deforming the metal backing 108 into fibers 104). In further embodiments, the amount of pressure applied by the rollers may be sufficient enough to plastically deform the metal backing 108, forcing metal at metal backing 108 to become physically integral with group 106 of parallel fibers. As used herein, metal is physically integral with fibers when the metal is continuously in contact with large contiguous portions of the surface area of each fiber (e.g., the entire surface area, more than half of the surface area, etc.). Separation and positioning of fibers 104 on the metal backing 108 are furthermore controlled to allow some of the metal backing between fibers and at the edges to be open to the top surface of the precursor tape 126.

In step 206, plasma sprayer 130 continuously sprays molten metal atop the precursor tape 126 to fully encapsulate the fibers 104 in a matrix of metal. That is, plasma sprayer 130 heats the metal, typically starting in powder form, to a melting temperature, and sprays the molten metal onto the precursor tape 126. This covers the top of the precursor tape 126 with molten metal, meaning that fibers 104 are now completely surrounded by a matrix of metal and held down onto the precursor tape 126. A volume ratio of fibers 104 to metal may be calibrated by adjusting a diameter or number of fibers 104, adjusting a thickness of the metal backing 108, or adjusting a volume of molten metal applied by plasma sprayer 130.

In step 208, molten metal atop the precursor tape 126 solidifies, resulting in MMC tape 140. The resulting MMC tape 140 may be further pressed by additional ones of the rollers 124 in order to consolidate the MMC tape 140. Rollers 124 that are upstream and downstream of plasma sprayer 130 work in tandem to maintain tension, and force contact between metal backing 108 and group 106 of fibers as plasma spraying occurs. This keeps the resulting MMC tape 140 uniform and void-free. This MMC tape 140 may be taken up onto spool 150 for storage and later use in laying up an MMC preform.

Method 200 provides a substantial advantage over prior techniques, in that it enables MMC to be fabricates as a tape, and as part of a high-rate and continuous process, without the need for fugitive binders (i.e., materials that are used to maintain fibers in an evenly spaced position with respect to each other). This enhances both the rate of fabrication and the quality of fabrication, in that long segments of continuous fiber may be precisely integrated into an MMC part as desired.

Figure 3:
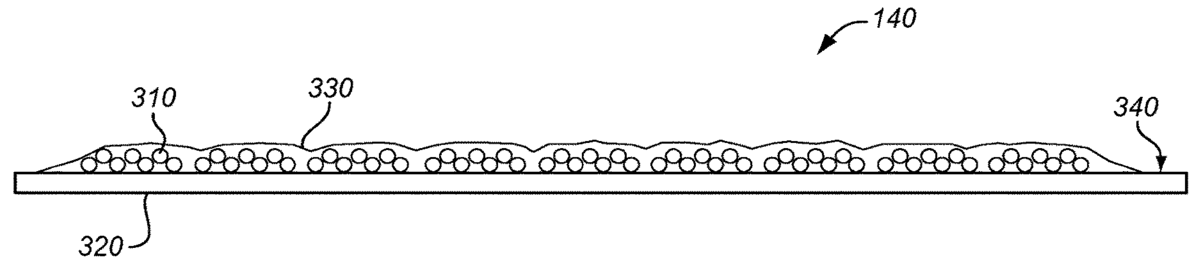
FIG. 3 is a diagram illustrating a cross-section of MMC tape in an illustrative embodiment.

FIG. 3 is a diagram illustrating a cross-section of an MMC tape 140 in an illustrative embodiment. FIG. 3 corresponds with view arrows 3 of FIG. 1. As shown in FIG. 3, MMC tape 140 includes a lower layer 320 of metal formed from metal backing 108 of FIG. 1, and further includes an upper layer 330 of metal which surrounds a group of fibers 310. Together, lower layer 320 and upper layer 330 form a matrix 340 of metal which encapsulates the fibers 310. Upper layer 330 and lower layer 320 need not be physically distinct from each other. As upper layer 330 is made of plasma-sprayed metal and lower layer 320 is made from metal backing 108, they may be made from the same metals as discussed above for these materials (e.g., aluminum, titanium, etc.).

With a discussion of fabrication and properties of MMC tape 140 provided above, further discussion focuses on the operations of machines which utilize MMC tape 140 to fabricate MMC preforms and/or consolidate MMC preforms into MMC parts. Note that for these further methods and systems, any suitable MMC tape may be utilized, including for example the MMC tape 140 of FIG. 1.

Figure 4:
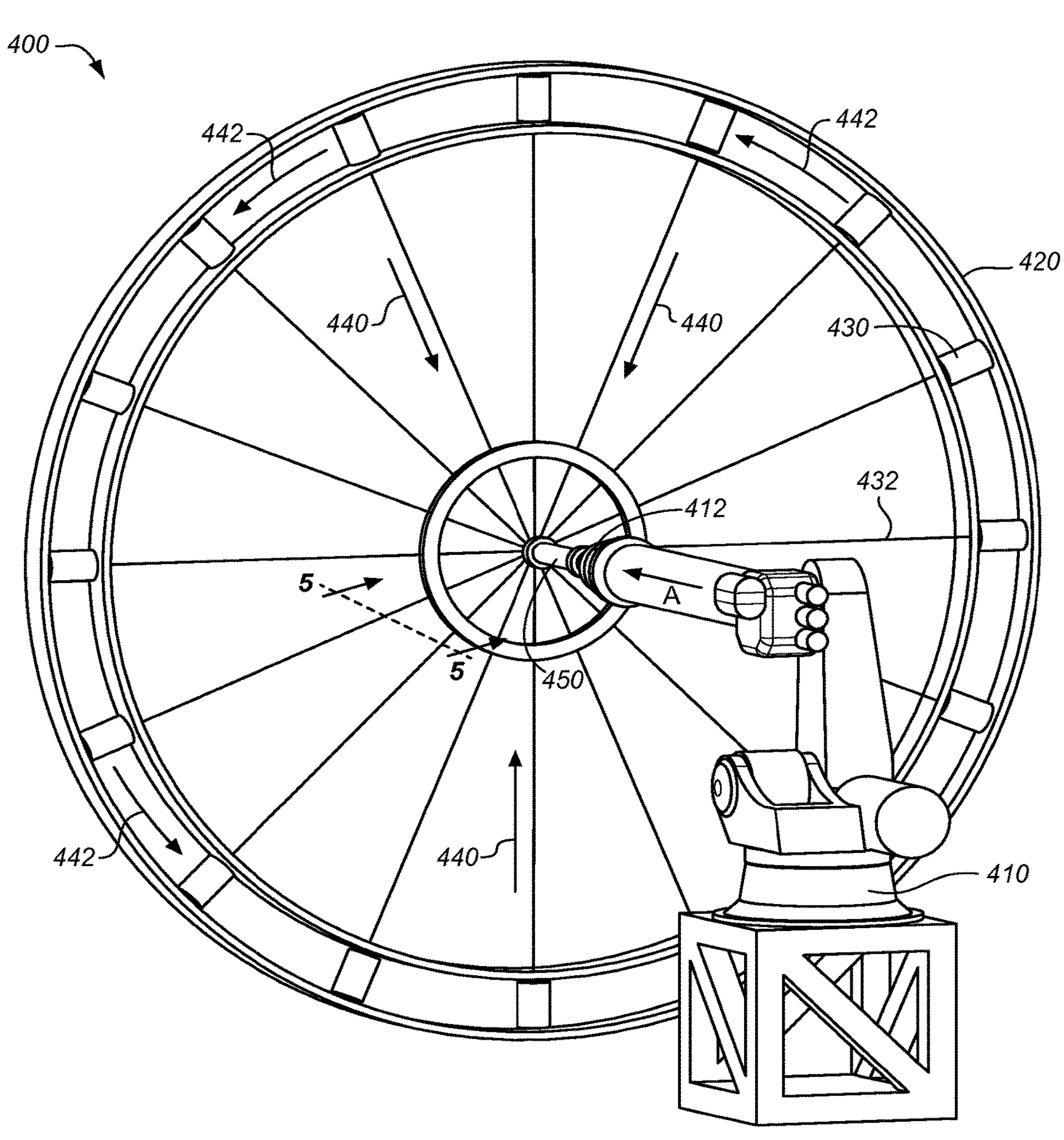
FIG. 4 is a perspective view of a braiding robot fabricating a preform with MMC tape in an illustrative embodiment.

FIG. 4 a perspective view of a robot 410 (e.g., a braiding robot) fabricating a preform with MMC tape in an illustrative embodiment. In this embodiment, robot 410 comprises part of a three-dimensional braiding layup system 400. Within the three-dimensional braiding layup system 400, multiple bobbins 430 having lanes 432 of MMC tape are arranged in a circumferential pattern (e.g., along frame 420). The MMC tape may comprise MMC tape 140 of FIG. 1, which has been fabricated by MMC tape fabrication system 100 of FIG. 1. An end effector 412 of the robot 410 controls axial displacement in direction A, and bobbins 430 move dynamically along frame 420 (in direction 442 or in any suitable controlled planetary orbits about preform 450 and movements with respect to each other) to dispose the lanes 432 in direction 440 onto preform 450. This results in braiding along the exterior of a cylindrical mandrel (e.g., mandrel 510 of FIG. 5). In further embodiments, some of lanes 432 comprise metal foil that is not reinforced by fibers. By controlling a ratio of lanes 432 that are metal foil to lanes 432 that comprise MMC tape, a volume ratio of metal to fibers within the preform (and hence the resulting MMC part) may be controlled.

Figure 5:
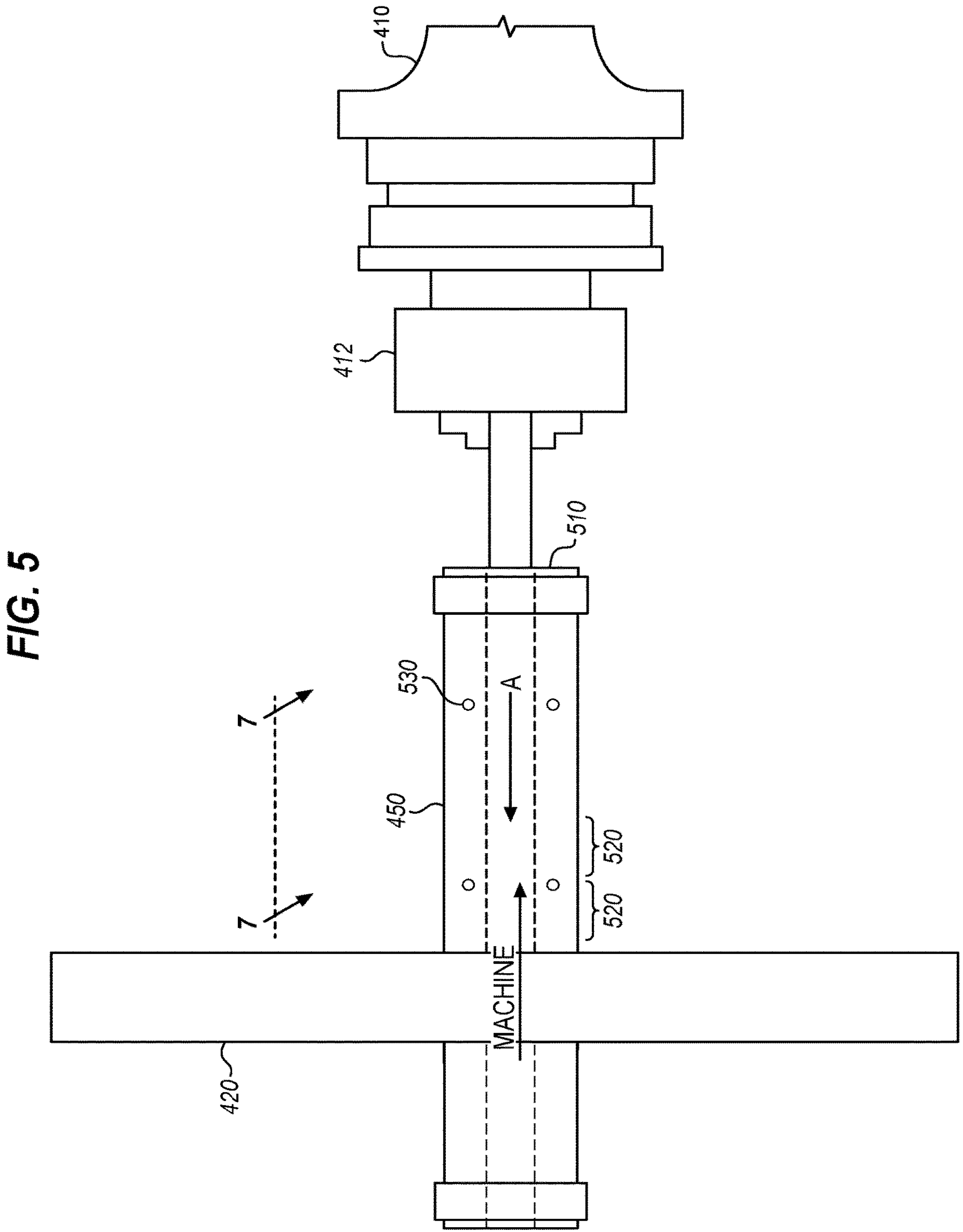
FIG. 5 is a side view of the braiding robot of FIG. 4 in an illustrative embodiment.
Figure 7:
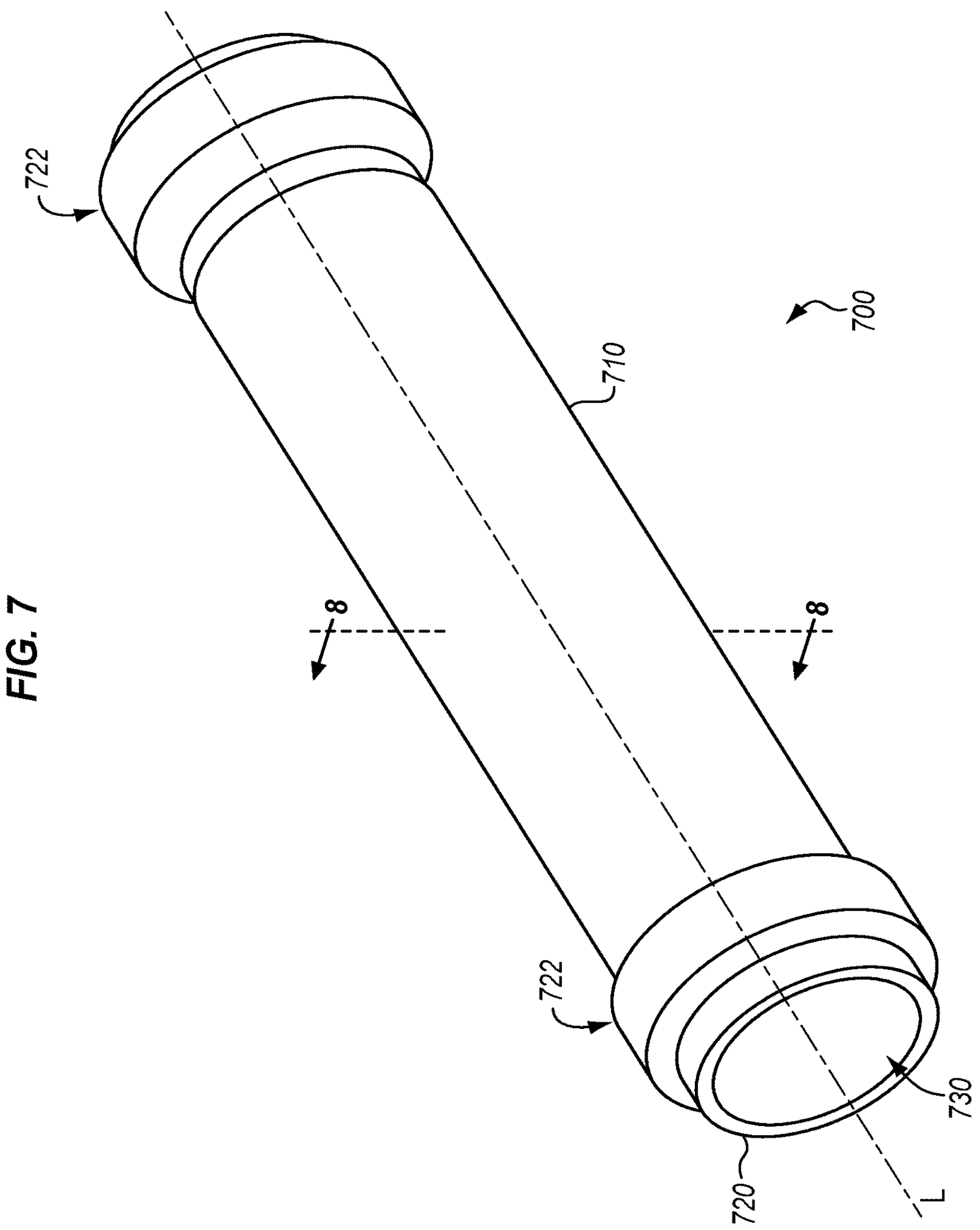
FIG. 7 is a perspective view of a preform for an MMC part in an illustrative embodiment.

FIG. 5 is a side view of the robot 410 of FIG. 4 in an illustrative embodiment, and corresponds with view arrows 5 of FIG. 4. As shown in FIG. 5, preform 450 is wrapped around a mandrel 510. Mandrel 510 may comprise, for example, a solid or hollow bar of metal, an extrusion or rough machined metal part, etc., and may be made from the same metal used in a matrix for the MMC tape. A wide range of fiber orientations may be applied to preform 450 via the motion of bobbins 430 at frame 420 (also referred to as a "braiding apparatus"). Furthermore, axial fiber orientations (e.g., along direction A) can be introduced by feeding axial precursor tape from multiple bobbins set on a creel, through the frame 420. Hoop orientations, if desired, may be introduced by braiding over a filament-wound precursor part, or by other means. Axial portions 520 of mandrel 510 are also illustrated. The mandrel 510, by virtue of its thermal expansion characteristics relative to the braided material of the preform, assists with the consolidation process by expanding radially outward at a higher rate when heated. The mandrel 510 can furthermore be machined to the desired dimensions following consolidation, and need not be solid in all embodiments. Spot welds 530 are also illustrated. More advanced braiding techniques may also be performed as desired to form biaxial braids (via biaxial braiding), triaxial braids (via triaxial braiding), or other braids at the preform 450. Upon completion of layup for preform 450, mandrel 510 may be machined (e.g., drilled out axially, as shown by the "MACHINE" direction in FIG. 5), resulting in a mandrel 510 that is hollow as depicted in FIG. 7, may remain solid, or may otherwise be machined out to a final net shape. Furthermore, if necessary, various locations on preform 450 may be spot-welded during layup (or otherwise prior to consolidation) to ensure physical integrity of the preform 450 prior to consolidation. However, most braided preforms will be stable enough to be able to forego any need for spot-welding.

Figure 6:
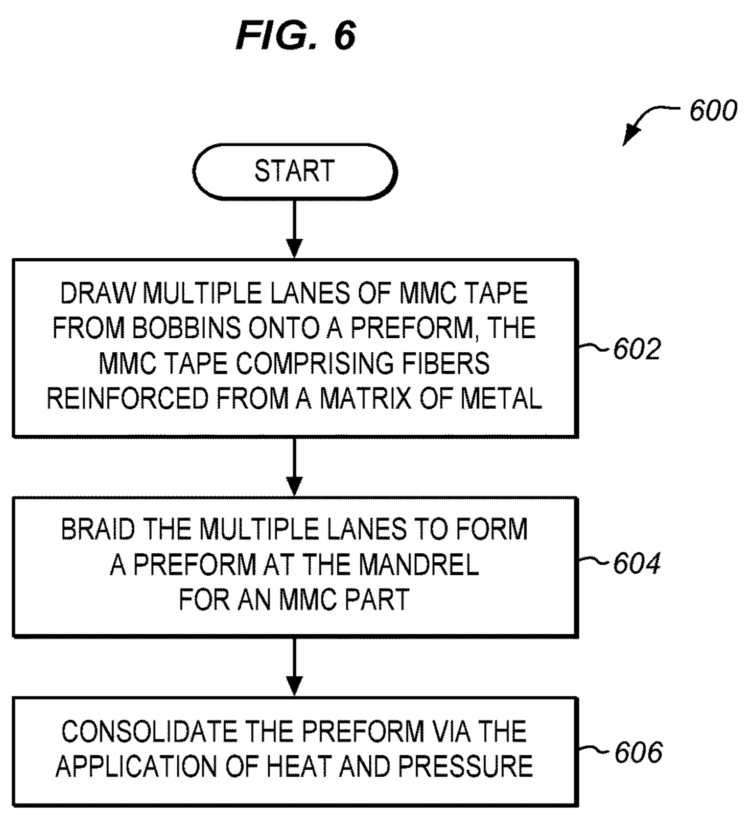
FIG. 6 is a flowchart illustrating a method for braiding MMC tape to fabricate a preform in an illustrative embodiment.

FIG. 6 is a flowchart illustrating a method 600 for braiding MMC tape to fabricate a preform in an illustrative embodiment. Assume, for this embodiment, that bobbins 430 have been loaded with MMC tape, and that ends (not shown) of lanes 432 have been drawn to mandrel 510 and affixed to mandrel 510 e.g., via an external collar or clamp, in a pattern that facilitates braiding.

In step 602, bobbins 430 proceed around preform 450 along frame 420. This action draws multiple lanes 432 of MMC tape from bobbins 430 onto preform 450 in a braided pattern. The MMC tape, as discussed above, comprises a matrix of metal reinforced by continuous fibers. Some lanes may also comprise unreinforced metal which is utilized to adjust a volume ratio of fibers to metal within the preform 450. Step 602 may further include orienting the lanes 432 in different directions to increase a strength of the resulting MMC part with respect to forces applied from the different directions.

In step 604, the lanes 432 are braided to form a preform 450 at the mandrel 510 for an MMC part. For example, lanes 432 may be braided by operating robot 410 to perform any suitable combination of axial and lateral motions that result in braiding. The finished braided version of the preform 450 may be also be manually overwrapped with a layer of metal foil or a tight-fitting metal split sleeve to provide an external, smooth surface over the braided region of the finished part. Once placed on the part, the metal sleeve seam can be sealed by a conventional welding operation and ground flush.

In step 606, the preform 450 is consolidated via the application of heat and pressure. This may be performed by heating the preform 450 in an inert oxygen-free environment to a temperature that permits flow and diffusion bonding of the metal among fibers and material layers in the braided solid. A diffusion bonding temperature may, for example, range between 1400 and 1500 degrees Fahrenheit (° F.) for aluminum, and between 1800 and 1900° F. for titanium.

After the preform has been consolidated, it may be cooled to form an MMC part for use as a component of any suitable structure. If necessary, exposed metal surfaces may be machined or finished by conventional means to meet desired engineering dimensional and surface requirements. Inspection of the finished part may be achieved by conventional nondestructive inspection methods such as fluorescent dye penetrant inspection, ultrasonic inspection, X-ray, or computed tomography scanning.

FIG. 7 is a perspective view of a preform 700 for an MMC part in an illustrative embodiment, and corresponds with view arrows 7 of FIG. 5. In this embodiment, preform 700 is laid up or overwrapped on a mandrel 720 that is hollow, having a void 730 that proceeds along an axial length (L) of the mandrel 720. Mandrel 720 also includes features 722, which may facilitate mating of a resulting composite part with another component of an aircraft. Features 722 may for example comprise a built-up section from which gear splines that facilitate interlocking of the resulting MMC part with one or more structural features of an aircraft, which may be precision-machined after preform consolidation. Preform 700 includes layers 710 of MMC tape which have been laid-up at mandrel 720. In this embodiment, mandrel 720 is made of the same metal as a matrix used for the MMC tape. Thus, mandrel 720 will be made integral with the preform 700 during consolidation, and will become an integral, metallurgically-bonded component of the resulting composite part.

Figure 8:
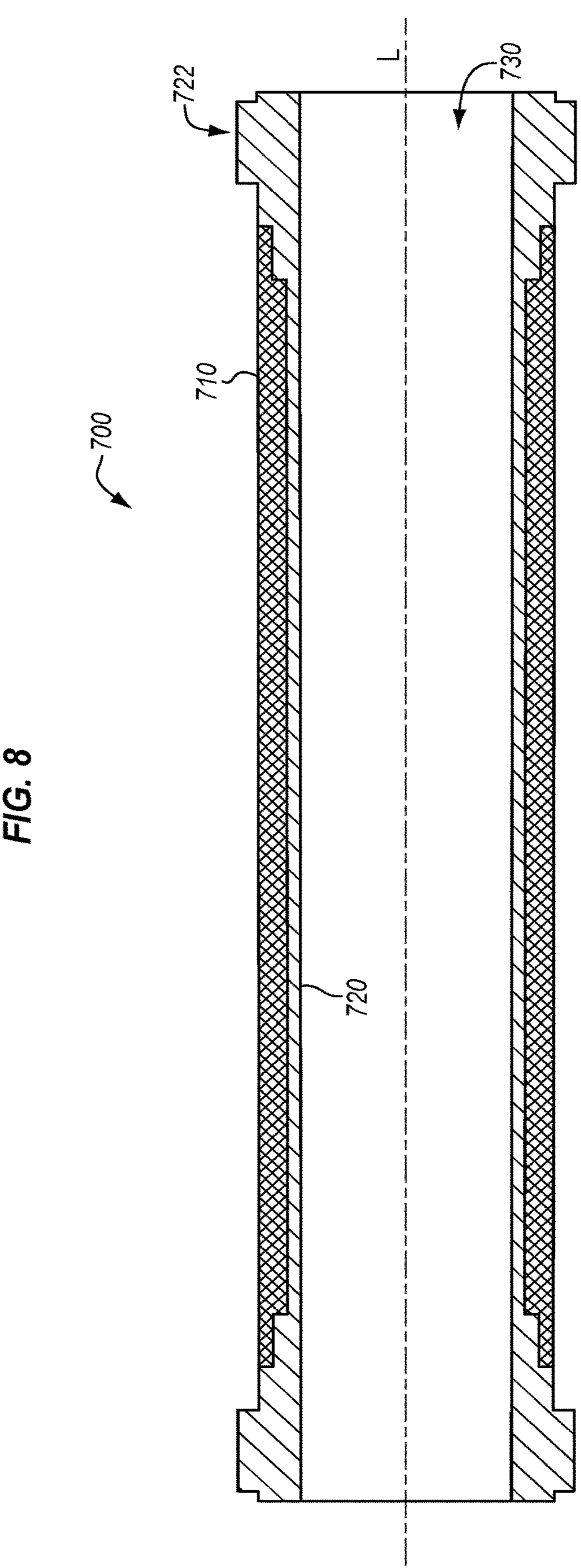
FIG. 8 is a section cut view of the MMC part of FIG. 6 in an illustrative embodiment.

FIG. 8 is a section cut view of the MMC part of FIG. 7 in an illustrative embodiment, and corresponds with view arrows 8 of FIG. 7. In this embodiment, void 730, and portions of mandrel 720 upon which layers 710 have been laid, are clearly visible. Layers 710 may themselves include or be covered by an overwrap (e.g., metal foil or a sleeve, not shown) to provide an external metal surface having desired surface characteristics.

Figure 9:
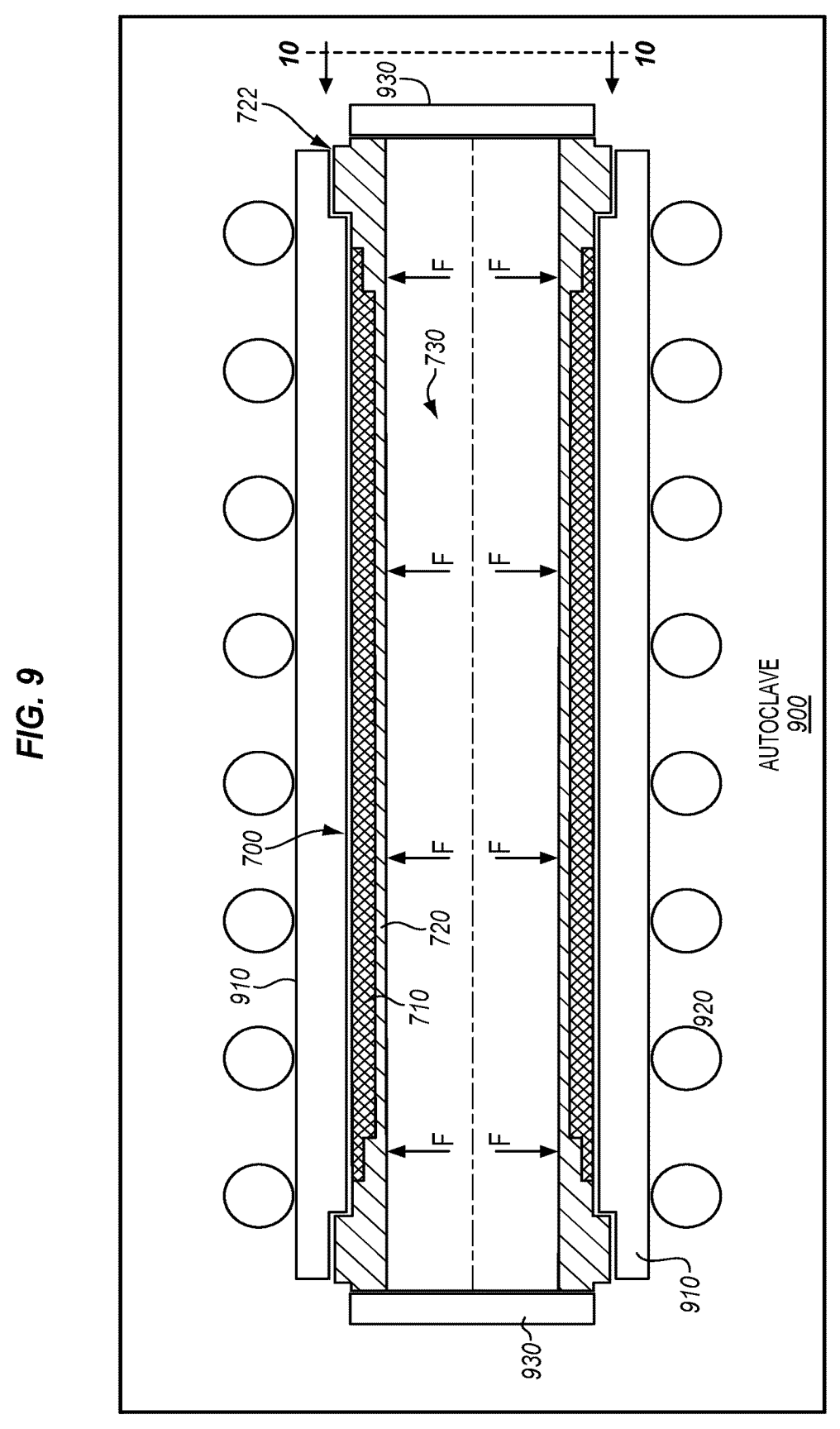

FIG. 9 is a section cut view of the MMC part of FIG. 7 being consolidated in a heater such as a controlled-atmosphere furnace, hot-isostatic pressure chamber, or autoclave 900 in an illustrative embodiment. As shown in FIG. 9, heat may be applied to preform 700 and mandrel 720 via heating elements 920, which may be isolated via a mold 910 (e.g., a segmented cast ceramic mold) that defines a shape for a resulting MMC part. Heating elements 920 may comprise radiative heating elements. However, in one embodiment, heating elements 920 comprise electromagnetic inductors. Induction heating of the MMC part is greatly facilitated by virtue of the fact that the preform 700 and mandrel 720 are metallic or contain a large proportion of metal, which reacts in response to induction currents to generate heat. This means that driving current through heating elements 920 directly generates heat within preform 700 and mandrel 720. Especially for thin parts, induction heating provides advantages in the form of higher heating rates, better temperature control, and less energy consumption when compared conventional radiative heating.

During consolidation, void 730 may be sealed with caps 930, and then pressurized with gas (e.g., an inert gas, such as argon). As mandrel 720 and preform 700 are heated to the consolidation temperature, diffusion bonding can take place, and the metal becomes soft and easily deformable under load. This means that pressure applied by a gas within void 730 may result in forces F that press the mandrel 720 against the stiffer preform 700 and mold 910, consolidating the preform 700 and the mandrel 720 into an integral whole having a desired shape for an MMC part. Aiding the consolidation process, it will be noted that the increase in temperature, and a difference in Coefficient of Thermal Expansion (CTE) between the fibers and the metal, causes a similar application of pressure to result in consolidation. That is, the CTE of the unreinforced metal in the mandrel 720 is higher than the MMC tape in the preform 700, which causes the mandrel 720 to exert a radial force on to the preform 700 MMC as temperature increases. This also places layers of the preform 700 into tension, which further facilitates consolidation of the preform 700. These combined effects facilitate diffusion bonding and consolidation of the preform into an MMC part and reduce the need for substantial applied forces F or internal pressure to achieve satisfactory consolidation. The difference in thermal expansion works to the advantage of the process regardless of whether the mandrel is solid or not. Furthermore, for some alloys and fiber orientations and part geometries, "auto-consolidation" (i.e., pressureless consolidation) is thus possible, or pressurization requirements are significantly reduced because of the consolidation assistance provided by thermal expansion of the mandrel. Upon cooling, metal within the preform 700 and the mandrel 720 become integral, resulting in a single unified MMC part.

Alternatively, for a solid mandrel 720, application of an external axial force to mandrel 720 (i.e., axially driving mandrel 720 in direction A of FIG. 5) may result in the creation of a radial pressure to preform 700, resulting in application of a radial consolidation force.

Figure 10:
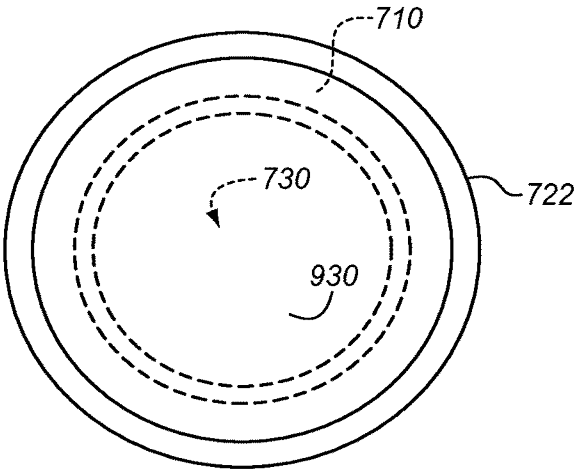
FIG. 10 is a front view of the MMC part of FIG. 6 in an illustrative embodiment.

FIG. 10 is a front view of the MMC part of FIG. 7 in an illustrative embodiment. FIG. 10 more clearly illustrates mandrel 720, features 722, and layers 710 of preform 700. These may together form an MMC part for use in the structure of an aircraft, such as torque transmission devices ("torque tubes"), tubular struts, stanchions, landing gear links, or pressure vessels.

Examples

In the following examples, additional processes, systems, and methods are described in the context of a system that fabricates and braids MMC tape to create preforms which are consolidated into MMC parts.

FIG. 11 is a block diagram of an MMC fabrication environment 1100 in an illustrative embodiment. In this embodiment, MMC fabrication environment 1100 includes MMC tape fabrication system 1110, tape 1140, MMC braiding system 1120, and autoclave 1130. MMC tape fabrication system 1110 includes spools 1111, from which fibers 1127 are drawn. Collimator 1129 parallelizes the fibers 1127 to form group 1112. Metal backing 1113 is applied to group 1112 via the application of pressure from rollers 1115. This results in precursor tape 1114, which is treated by plasma sprayer 1117 within chamber 1116 to form tape 1118. Tape 1118 is taken up onto spool 1119. Tape 1118 has the same makeup/composition as tape 1140. Tape 1140 includes plasma-sprayed metal 1146 and metal backing 1142, which together form matrix 1148. Fibers 1144 are encapsulated within matrix 1148.

MMC braiding system 1120 includes robot 1121, and controller 1122. Controller 1122 operates robot 1121 based on instructions stored in memory (e.g., an NC program). Controller 1122 may be implemented, for example, as custom circuitry, as a hardware processor executing programmed instructions, or some combination thereof.

Robot 1121 is directly coupled with mandrel 1123, which includes features 1128. Preform 1124 is laid-up onto mandrel 1123, by drawing tape from bobbins 1126, which are arranged in a circumferential pattern at frame 1125. Autoclave 1130 is used to consolidate the preform 1124 and/or the mandrel 1123, and includes heating elements 1132 (e.g., inducers) as well as a mold 1134. Machine tool 1190 may machine mandrel 1123, if needed. A wrap 1192 is also placed over preform 1124, and may be added for example after braiding has been completed.

Figure 12:
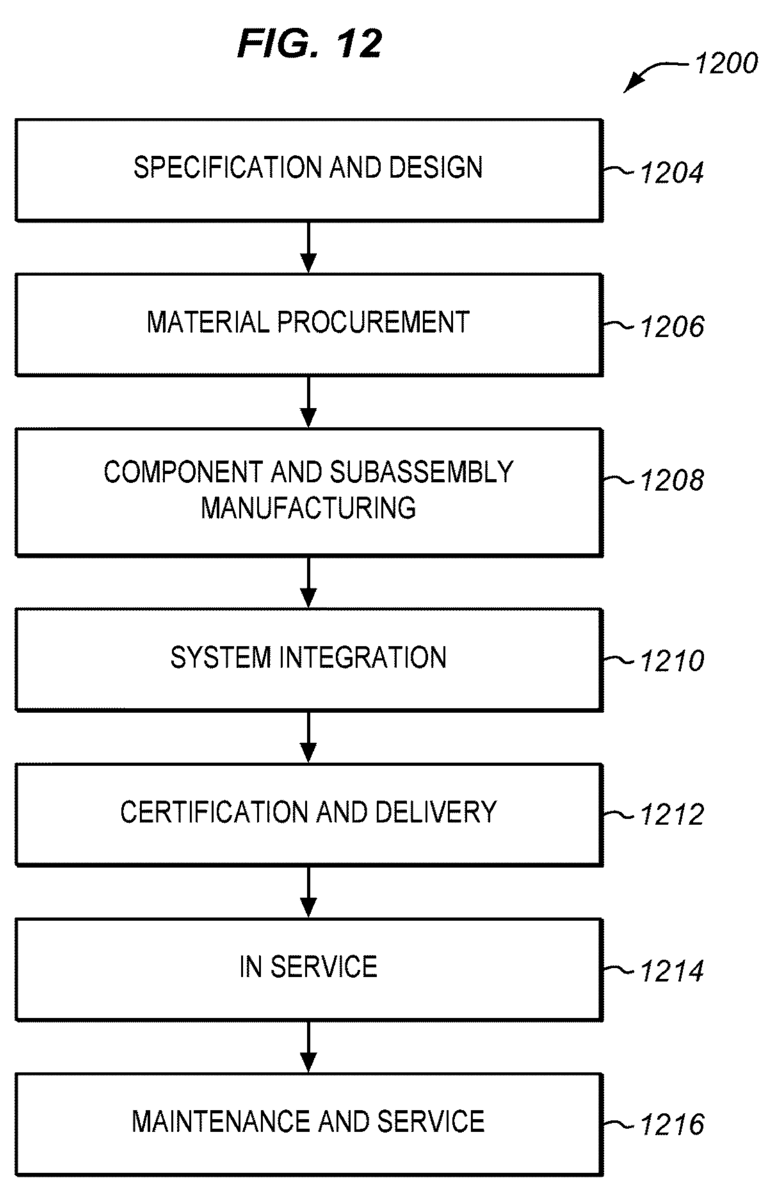
FIG. 12 is a flow diagram of aircraft production and service methodology in an illustrative embodiment.
Figure 13:
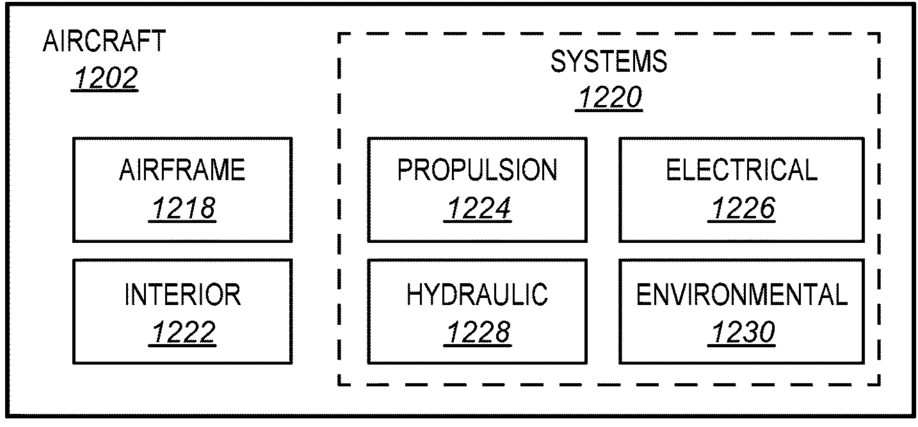
FIG. 13 is a block diagram of an aircraft in an illustrative embodiment.

Referring more particularly to the drawings, embodiments of the disclosure may be described in the context of aircraft manufacturing and service in method 1200 as shown in FIG. 12 and an aircraft 1202 as shown in FIG. 13. During pre-production, method 1200 may include specification and design 1204 of the aircraft 1202 and material procurement 1206. During production, component and subassembly manufacturing 1208 and system integration 1210 of the aircraft 1202 takes place. Thereafter, the aircraft 1202 may go through certification and delivery 1212 in order to be placed in service 1214. While in service by a customer, the aircraft 1202 is scheduled for routine work in maintenance and service 1216 (which may also include modification, reconfiguration, refurbishment, and so on). Apparatus and methods embodied herein may be employed during any one or more suitable stages of the production and service described in method 1200 (e.g., specification and design 1204, material procurement 1206, component and subassembly manufacturing 1208, system integration 1210, certification and delivery 1212, service 1214, maintenance and service 1216) and/or any suitable component of aircraft 1202 (e.g., airframe 1218, systems 1220, interior 1222, propulsion system 1224, electrical system 1226, hydraulic system 1228, environmental 1230).

Each of the processes of method 1200 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 13, the aircraft 1202 produced by method 1200 may include an airframe 1218 with a plurality of systems 1220 and an interior 1222. Examples of systems 1220 include one or more of a propulsion system 1224, an electrical system 1226, a hydraulic system 1228, and an environmental system 1230. Any number of other systems may be included. Although an aerospace example is shown, the principles of the invention may be applied to other industries, such as the automotive industry.

As already mentioned above, apparatus and methods embodied herein may be employed during any one or more of the stages of the production and service described in method 1200. For example, components or subassemblies corresponding to component and subassembly manufacturing 1208 may be fabricated or manufactured in a manner similar to components or subassemblies produced while the aircraft 1202 is in service. Also, one or more apparatus embodiments, method embodiments, or a combination thereof may be utilized during the subassembly manufacturing 1208 and system integration 1210, for example, by substantially expediting assembly of or reducing the cost of an aircraft 1202. Similarly, one or more of apparatus embodiments, method embodiments, or a combination thereof may be utilized while the aircraft 1202 is in service, for example and without limitation during the maintenance and service 1216. For example, the techniques and systems described herein may be used for material procurement 1206, component and subassembly manufacturing 1208, system integration 1210, service 1214, and/or maintenance and service 1216, and/or may be used for airframe 1218 and/or interior 1222. These techniques and systems may even be utilized for systems 1220, including, for example, propulsion system 1224, electrical system 1226, hydraulic 1228, and/or environmental system 1230.

In one embodiment, a part comprises a portion of airframe 1218, and is manufactured during component and subassembly manufacturing 1208. The part may then be assembled into an aircraft in system integration 1210, and then be utilized in service 1214 until wear renders the part unusable. Then, in maintenance and service 1216, the part may be discarded and replaced with a newly manufactured part. Inventive components and methods may be utilized throughout component and subassembly manufacturing 1208 in order to manufacture new parts.

Any of the various control elements (e.g., electrical or electronic components) shown in the figures or described herein may be implemented as hardware, a processor implementing software, a processor implementing firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, a control element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments are described herein, the scope of the disclosure is not limited to those specific embodiments. The scope of the disclosure is defined by the following claims and any equivalents thereof.

What is claimed is:

1. A process of forming a Metal Matrix Composite (MMC) tape configured for heating and forming a preform, the process comprising:

forming a lane of MMC tape, by spraying a molten metal within a plasma and combining the molten metal with a metal backing into a matrix of metal; and reinforcing the lane by disposing, within the matrix of metal between the metal backing and the plasma, fibers extending along a length of the lane.

2. The process of claim 1, further comprising heating the MMC tape on a mandrel to a diffusion bonding temperature.

3. The process of claim 1, further comprising heating a mandrel with electromagnetic inductors.

4. The process of claim 1, wherein the preform is for a portion of an aircraft.

5. The process of claim 1, wherein:

the fibers comprise a material selected from the group consisting of: carbon, graphite, silicon carbide, silicon nitride, boron, aluminum oxide, and ceramic oxides.

6. The process of claim 1, wherein the metal comprises a material selected from the group consisting of: aluminum, titanium, copper, and superalloys.

7. The process of claim 1, further comprising storing the MMC tape, comprising the matrix of metal reinforced by fibers, on bobbins.

8. The process of claim 1, further comprising increasing a strength, with respect to forces applied from different directions, of the MMC tape by adjusting a ratio of a volume of fibers to a volume of metal by adjusting at least one of: a diameter of each fiber in the fibers, a thickness of the metal backing, or a volume of the molten metal applied to the metal backing.

9. A process of forming a Metal Matrix Composite (MMC) tape, the process comprising:

feeding fibers from spools into a chamber;

feeding a metal backing into the chamber;

forming a precursor tape by pressing, in the chamber, the fibers onto the metal backing;

forming a metal matrix by encapsulating the fibers onto the metal backing by spraying, in the chamber, the precursor tape with a plasma comprising a molten metal;

solidifying the molten metal; and after solidifying the molten metal, consolidating the MMC tape by pressing the tape with additional rollers.

10. The process of claim 9, further comprising pressing the fibers onto the metal backing using rollers comprising temperature sensors and partly deforming the metal backing to become physically integral with the fibers.

11. The process of claim 9, further comprising the fibers receiving a coating, promoting wettability of the fibers and limiting an adverse interaction of the fibers with the metal matrix during a consolidation before entering the chamber.

12. The process of claim 9, further comprising the fibers comprising one of continuous strands comprising: carbon, graphite, silicon carbide, silicon nitride, boron, aluminum oxide, ceramic oxides, or other ceramic or refractory fibers.

13. The process of claim 9, further comprising the fibers comprising one of continuous individual monofilament fibers comprising: boron, silicon carbide, silicon nitride, aluminum oxide, or other ceramic or refractory materials.

14. The process of claim 9, further comprising a diameter of fibers being between one thousandth of an inch and five thousandths of an inch.

15. The process of claim 9, further comprising the chamber being a vacuum chamber or filled with an inert gas for controlling chemical reactions occurring during plasma spraying in the chamber.

16. The process of claim 9, further comprising the metal backing comprising a foil comprising: an aluminum, a titanium, a copper, a magnesium, a beryllium, or a nickel, alloy.

17. The process of claim 9, further comprising the metal backing comprising a width in a range of one-eighth to one-quarter of an inch.

18. The process of claim 9, further comprising the metal backing comprising a thickness in a range of one thousandth of an inch and five thousandths of an inch.

19. The process of claim 9, further comprising:

forming the molten metal by heating a metal powder to a melting temperature of the metal powder; and adjusting a ratio of a volume of fibers to a volume of metal by adjusting at least one of: a diameter of each fiber in the fibers, a thickness of the metal backing, a volume of the molten metal applied to the metal backing.

20. A process of forming a Metal Matrix Composite (MMC) tape, the process comprising:

mounting on spools, fibers comprising continuous strands comprising: carbon, graphite, silicon carbide, silicon nitride, boron, aluminum oxide, ceramic oxides, or other ceramic or refractory fibers, or continuous individual monofilament fibers comprising: boron, silicon carbide, silicon nitride, aluminum oxide, or other ceramic or refractory materials, with a diameter of the fibers being between one thousandth of an inch and five thousandths of an inch;

coating the fibers, before entering a chamber, with a coating promoting a wettability and limiting an adverse interaction of the fibers with a metal matrix during a consolidation;

feeding the fibers from the spools through a collimator and into the chamber;

feeding a metal backing comprising a foil comprising: an aluminum, a titanium, a copper, a magnesium, a beryllium, or a nickel, alloy, comprising a width in a range of one-eighth to one-quarter of an inch and a range of one thousandth of an inch and five thousandths of an inch, into the chamber;

forming a precursor tape by pressing, using rollers comprising temperature sensors in the chamber, the fibers onto the metal backing and thereby partly deforming the metal backing to become physically integral with the fibers;

forming a molten metal by heating a metal powder to a melting temperature of the metal powder;

forming a matrix of metal by encapsulating the fibers onto the metal backing by spraying, in the chamber, the precursor tape with a plasma comprising the molten metal, wherein the chamber is either a vacuum or filled with an inert gas for controlling chemical reactions occurring during spraying the plasma in the chamber;

solidifying the molten metal; and after solidifying the molten metal, consolidating the MMC tape by pressing the tape with additional rollers.

* * * * *